(12) United States Patent
Schreuder

(10) Patent No.: US 8,431,101 B2
(45) Date of Patent: Apr. 30, 2013

(54) METHOD OF TREATING AN ACID GAS STREAM AND AN APPARATUS THEREFOR

(75) Inventor: Sandra Schreuder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/263,139

(22) PCT Filed: Apr. 6, 2010

(86) PCT No.: PCT/EP2010/054542
§ 371 (c)(1),
(2), (4) Date: Nov. 21, 2011

(87) PCT Pub. No.: WO2010/115898
PCT Pub. Date: Oct. 14, 2010

(65) Prior Publication Data
US 2012/0063991 A1    Mar. 15, 2012

(30) Foreign Application Priority Data
Apr. 8, 2009 (EP) .................................. 09147607

(51) Int. Cl.
*B01D 53/52* (2006.01)
*B01D 53/74* (2006.01)
*C01B 3/50* (2006.01)
*C01C 1/242* (2006.01)

(52) U.S. Cl.
USPC ........... 423/220; 423/355; 423/549; 423/550; 422/160; 422/168; 422/187; 252/373

(58) Field of Classification Search ............... 423/220, 423/355, 549, 550; 422/160, 168, 187; 252/373
See application file for complete search history.

(56) References Cited

U.S. PATENT DOCUMENTS

| | | | |
|---|---|---|---|
| 3,013,860 A * | 12/1961 | Jones | 423/549 |
| 3,312,525 A | 4/1967 | Schmidt et al. | 23/196 |
| 3,822,337 A | 7/1974 | Wunderlich et al. | 53/34 |
| 3,895,101 A | 7/1975 | Tsuruta | 423/574 |
| 4,242,305 A * | 12/1980 | Spevack | 422/129 |
| 7,258,848 B1 * | 8/2007 | Blackwell et al. | 423/237 |

* cited by examiner

*Primary Examiner* — Timothy Vanoy
(74) *Attorney, Agent, or Firm* — Charles W. Stewart

(57) ABSTRACT

Disclosed is a method of treating an acid gas stream through a series of process steps to provide an ammonium sulfphate stream. The method involves passing the acid gas stream to an incinerator to oxidize the $H_2S$ to $SO_2$ to yield an incinerator flue gas stream. The incinerator flue gas stream is passed to a sulphuric acid unit that produces $H_2SO_4$ from the $SO_2$ of the incinerator flue gas stream and to yield an aqueous sulphuric acid stream and a sulphuric acid unit off-gas stream. At least part of the aqueous sulphuric acid stream is passed to an ammonia scrubber wherefrom an aqueous ammonium suphate stream is yielded.

8 Claims, 2 Drawing Sheets

METHOD OF TREATING AN ACID GAS STREAM AND AN APPARATUS THEREFOR

PRIORITY CLAIM

The present application claims priority from PCT/EP2010/054542, filed 6 Apr. 2010, which claims priority from European Application 09157607.4, filed 8 Apr. 2009.

The present invention provides a method of treating an acid gas stream comprising $H_2S$ and $CO_2$, such as an acid gas stream produced by an acid gas removal unit, for instance in the cleaning of syngas or refinery gas, to provide an aqueous ammonium sulphate stream, and an apparatus therefor. The method and apparatus further utilise a first off-gas stream which comprises $NH_3$, $H_2S$ and $CO_2$.

Acid gas comprising hydrogen sulphide and carbon dioxide can originate from various sources. For example, crude oil may contain a range of sulphur-containing contaminants which can generate a sulphur dioxide comprising acid gas stream during the refining process. In addition, a refinery off-gas stream, for instance from the catalytic cracker, may comprise ammonia if there is any nitrogen present in compounds found in the feed gas. Alternatively, the catalytic cracker may provide a HCN-comprising stream which can be hydrolysed to generate an off-gas stream comprising ammonia.

Another example of an acid gas is raw synthesis gas. Synthesis gas or "syngas" are general terms which are used synonymously herein and which are applied to mixtures of carbon monoxide, hydrogen and optional inert components that are derived from the gasification of coal, oil residues, waste or biomass.

The main components of syngas are hydrogen and carbon monoxide. Further, often carbon dioxide and traces of methane are present. In addition, unwanted components such as HCN, $NH_3$, $H_2S$ and sometimes COS and $CS_2$ may also be present in raw or untreated synthesis gas. These unwanted components can be removed in one or more treatment stages to provide a treated syngas. The treated syngas is a valuable feedstock useful in the Fischer-Tropsch process for the manufacture of liquid hydrocarbons.

The removal of hydrogen sulphide from raw synthesis gas to low levels is of considerable importance, because hydrogen sulphide may bind irreversibly to catalysts, such as Fischer-Tropsch catalysts, causing sulphur poisoning. This can result in a deactivated catalyst, significantly lowering the catalyst activity. In addition, if the synthesis gas is to be used for another purpose, such as a fuel to be combusted for power generation, the generating apparatus, such as a gas turbine, may have limits upon the maximum hydrogen sulphide which can be tolerated in its fuel stream. Furthermore, environmental limits may be set for sulphur species emitted in the exhaust gases from such power generation.

Treatment processes to remove acid gasses from compositions such as synthesis gas and refinery gas generate acid gas streams which may in turn be treated. It is conventional to treat acid gas comprising hydrogen sulphide using the Claus process, in which hydrogen sulphide is reacted in a multiple-step process to produce elemental sulphur and water.

The present invention provides an alternative method of treating an acid gas stream comprising hydrogen sulphide and carbon dioxide using an off-gas stream which comprises ammonia, to generate ammonium sulphate, a commercial product useful as a fertiliser, from the sulphur in the hydrogen sulphide-comprising acid gas and the ammonia in the off-gas stream. A corresponding apparatus is also provided.

In a first aspect, the present invention provides a method of treating an acid gas stream comprising $H_2S$ and $CO_2$ to provide an aqueous ammonium sulphate stream, comprising at least the steps of:
(a) passing an acid gas stream comprising $H_2S$ and $CO_2$ to an incinerator to oxidise $H_2S$ to $SO_2$ to provide an incinerator flue gas stream comprising $SO_2$ and $CO_2$;
(b) passing the incinerator flue gas stream to a sulphuric acid unit to produce $H_2SO_4$ from $SO_2$ in the flue gas stream to provide an aqueous sulphuric acid stream and a sulphuric acid unit off-gas stream comprising $CO_2$; and
(c) passing at least a part of the aqueous sulphuric acid stream to an ammonia scrubber to separate $NH_3$ from a first off-gas stream which comprises $NH_3$, $H_2S$ and $CO_2$ to provide a scrubber off-gas stream comprising $H_2S$ and $CO_2$ and an aqueous ammonium sulphate stream.

The aqueous sulphuric acid stream which is generated from the hydrogen sulphide in the acid gas stream is advantageously used to scrub a first off-gas stream to remove ammonia.

The ammonia present in the first off-gas stream, which is conventionally incinerated to $N_2$ and $H_2O$, is a valuable commercial product, particularly useful in the manufacture of ammonium-based fertilizers.

The present invention provides a method in which the ammonia in a first off-gas stream can be used to generate an aqueous ammonium sulphate stream, thus advantageously avoiding the incineration of this valuable component and allowing its subsequent use, for instance as a fertilizer product.

In a preferred aspect, the acid gas stream and first off-gas stream are generated as part of the same process, for instance as part of a syngas treatment or oil refining process, such that an integrated method is provided. Preferably, one or both of the acid gas stream and first off-gas stream can be provided as part of the treatment of a syngas stream.

In a further aspect, the present invention provides an apparatus for treating an acid gas stream comprising $H_2S$ and $CO_2$ to provide an aqueous ammonium sulphate stream, comprising at least:
an incinerator to oxidise $H_2S$ to $SO_2$ in an acid gas stream comprising $H_2S$ and $CO_2$, said incinerator having a first inlet for the acid gas stream and a first outlet for an incinerator flue gas stream comprising $SO_2$ and $CO_2$;
a sulphuric acid unit to produce $H_2SO_4$ from $SO_2$ in the incinerator flue gas stream, said sulphuric acid unit having a first inlet for the incinerator flue gas stream connected to the first outlet of the incinerator, a first outlet for an aqueous sulphuric acid stream and a second outlet for a sulphuric acid unit off-gas stream comprising $CO_2$;
an ammonia scrubber to separate $NH_3$ from a first off-gas stream which comprises $NH_3$, $H_2S$ and $CO_2$ to provide a scrubber off-gas stream comprising $H_2S$ and $CO_2$ and an aqueous ammonium sulphate stream, said ammonia scrubber having a first inlet for the first off-gas stream, a second inlet for the aqueous sulphuric acid stream connected to the first outlet of the sulphuric acid unit, a first outlet for the scrubber off-gas stream and a second outlet for the aqueous ammonium sulphate stream.

Embodiments of the present invention will now be described by way of example only, and with reference to the accompanying non-limiting drawings in which.

For the purpose of this description, a single reference number will be assigned to a line as well as a stream carried in that line. The same reference numbers refer to similar components, streams or lines.

Figure 1:
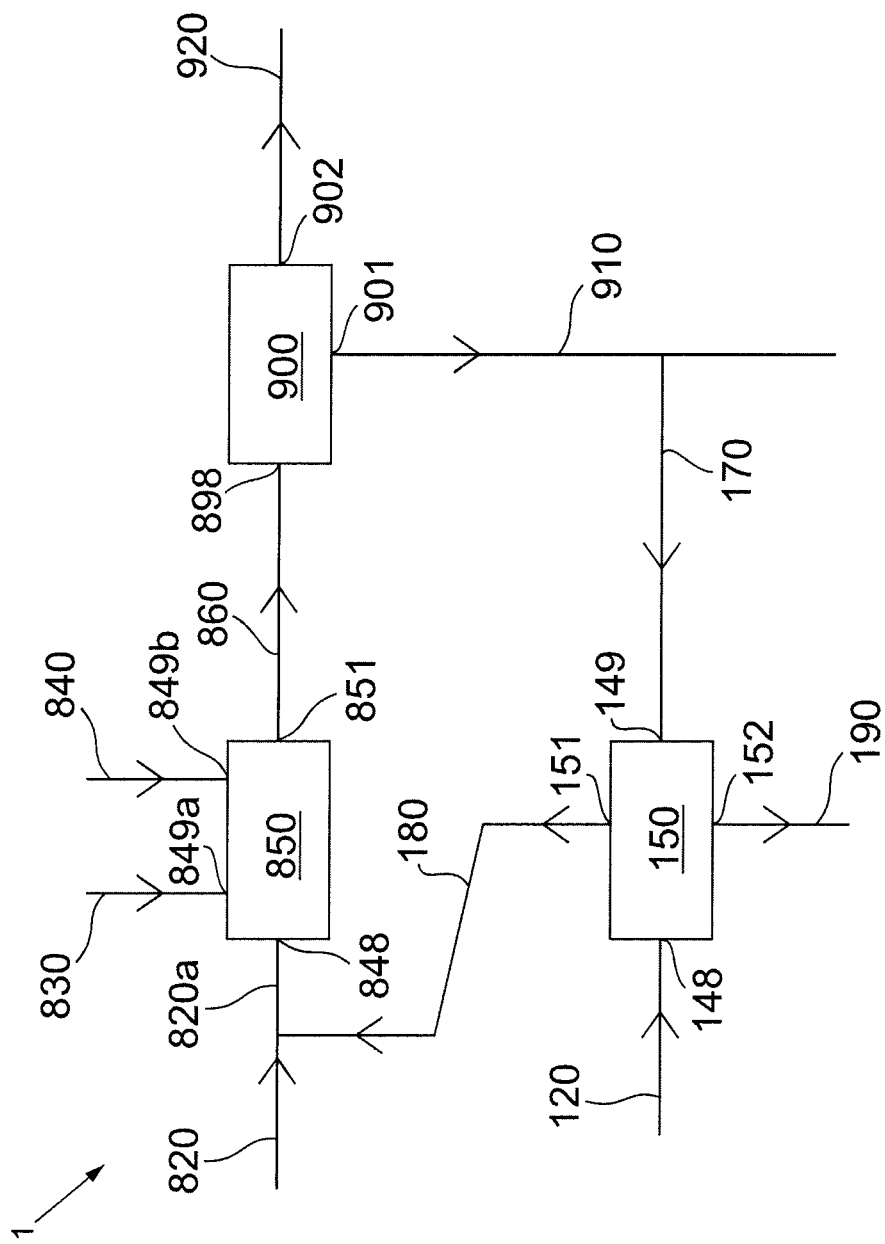
FIG. 1 shows a first embodiment of a typical scheme for treating an acid gas according to the method of the invention.

FIG. 1 shows a generalised acid gas treatment apparatus 1, utilising the method disclosed herein. An acid gas stream 820, such as an acid gas stream from the treatment of a syngas stream in a gasification process is provided. The acid gas stream 820 comprises $CO_2$ and $H_2S$.

The acid gas stream 820 can be passed to the first inlet 848 of an incinerator 850. The incinerator 850 oxidises the combustible components of the acid gas stream 820 (and optionally the scrubber off-gas stream 180 and/or stripper off-gas slip stream 65 discussed below) to provide an incinerator flue gas stream 860 at a first outlet 851. The hydrogen sulphide in the acid gas stream 820 is partially oxidised to sulphur dioxide in the incinerator 850. The incinerator flue gas stream comprises $CO_2$ and $SO_2$. In the case that $NH_3$ is present in any scrubber off-gas stream 180 and/or stripper off-gas slip stream 65, the incinerator flue gas stream will further comprises the combustion products of $NH_3$, such as $H_2O$ and $N_2$. An oxygen-comprising stream 830 such as air can also be supplied to the incinerator 850 at a second inlet 849a to support combustion, and, if necessary a hydrocarbon-comprising fuel stream, 840, can be passed to a third inlet 849b.

In an embodiment not shown in FIG. 1, further streams may also be provided to the incinerator. If the hydrogen sulphide content in the acid gas stream is insufficient to allow sulphuric acid production, a molten sulphur stream can also be passed to the incinerator to provide an additional source of sulphur.

The incinerator flue gas stream 860 can be passed to the first inlet 898 of a sulphuric acid unit 900, which removes sulphur dioxide from the incinerator flue gas stream 860 and uses it to generate an aqueous sulphuric acid stream 910 at a first outlet 901. A sulphuric acid unit off-gas stream 920 comprising $CO_2$ and if ammonia was provided to the incinerator 850, $N_2$ and $H_2O$, is provided at a second outlet 902.

The sulphuric acid unit 900 can produce sulphuric acid from the sulphur dioxide in the incinerator flue gas stream 860 in a manner known in the art. For example, the sulphur dioxide can first be oxidised to sulphur trioxide, $SO_3$, with oxygen from an oxygen-comprising stream such as air. A catalyst, such a vanadium (V) oxide catalyst can be present.

The gaseous sulphur trioxide can then be treated with water, to produce sulphuric acid in an exothermic reaction. In order to control the heat evolved, it is preferred to treat the sulphur trioxide with 2-3 wt % water comprising 97-98 wt % sulphuric acid to produce 98-99 wt % concentrated sulphuric acid.

In an alternative embodiment, the sulphur trioxide can be treated with oleum, $H_2S_2O_7$, to form concentrated sulphuric acid. Such processes together with other methods for manufacturing sulphuric acid from sulphur dioxide are well known to the skilled person.

The concentrated sulphuric acid can then be added to water to provide aqueous sulphuric acid, which exits the sulphuric acid unit 900 at first outlet 901 as aqueous sulphuric acid stream 910. At least a part, 170, of the aqueous sulphuric acid stream 910 can be passed to the second inlet 149 of an ammonia scrubber 150.

A first off-gas stream 120 can be passed to a first inlet 148 of the ammonia scrubber 150. The first off-gas stream 120 comprises $NH_3$, $H_2S$ and $CO_2$. The first off-gas stream 120 is preferably an off-gas stream generated as part of the treatment method. This is discussed in greater detail in relation to FIG. 2 in which the first off-gas stream can be an off-gas stream from a sour water or sour slurry stripper. Alternatively, the first off-gas stream 120 may have a source external to the acid gas treatment apparatus 1.

The ammonia scrubber 150 treats the first off-gas stream 120 to remove ammonia to provide a scrubber off-gas stream 180 comprising $H_2S$ and $CO_2$ at a first outlet 151. The first-off gas stream 120 is treated to separate ammonia by scrubbing with the aqueous sulphuric acid stream 170 produced by the sulphuric acid unit 900, which enters the ammonia scrubber 150 at a second inlet 149. The aqueous sulphuric acid stream 170 reacts with the basic ammonia to provide an aqueous ammonium sulphate stream 190 at a second outlet 152 of the ammonia scrubber. Such a stream is useful as a fertiliser product. The remaining gases exit the ammonia scrubber 150 at a first outlet 151, as the scrubber off-gas stream 180. This stream comprises $H_2S$ and $CO_2$ and is depleted of, more preferably substantially free of, $NH_3$.

The process is especially suitable for a first off-gas stream having an amount of $NH_3$ of between 10 and 6000 ppmv, preferably between 20 and 2000 ppmv. The temperature in the ammonia scrubber is suitably between 5 and 70° C., preferably between 10 and 50° C., to achieve a sufficient removal of $NH_3$ at a low temperature. The pressure in the ammonia scrubber should be sufficient to overcome the pressure drop in the downstream equipment, with the upper limit determined by the upstream equipment which is discussed in more detail in relation to FIG. 2. However, the higher the pressure in the upstream equipment, the more difficult it will be to remove ammonia and acid gases from the water. The pressure in the ammonia scrubber 150 is suitably between 1 and 10 bara, preferably between 1.3 and 4 bara, to achieve a sufficient removal of $NH_3$ at a low temperature.

The scrubber off-gas stream 180 can be used to generate an additional source of sulphur dioxide for the sulphuric acid unit 900 from the hydrogen sulphide component. This can be achieved by passing the scrubber off-gas stream 180 to the incinerator 850, where the hydrogen sulphide is combusted to provide the sulphur dioxide feedstock. In the embodiment shown in FIG. 1, the scrubber off-gas stream 180 is combined with the acid gas stream 820 before being passed to the first inlet 848 of the incinerator 850 as combined acid gas stream 820a. However, the scrubber off-gas stream can also be passed to a separate inlet of the incinerator 850.

Figure 2:
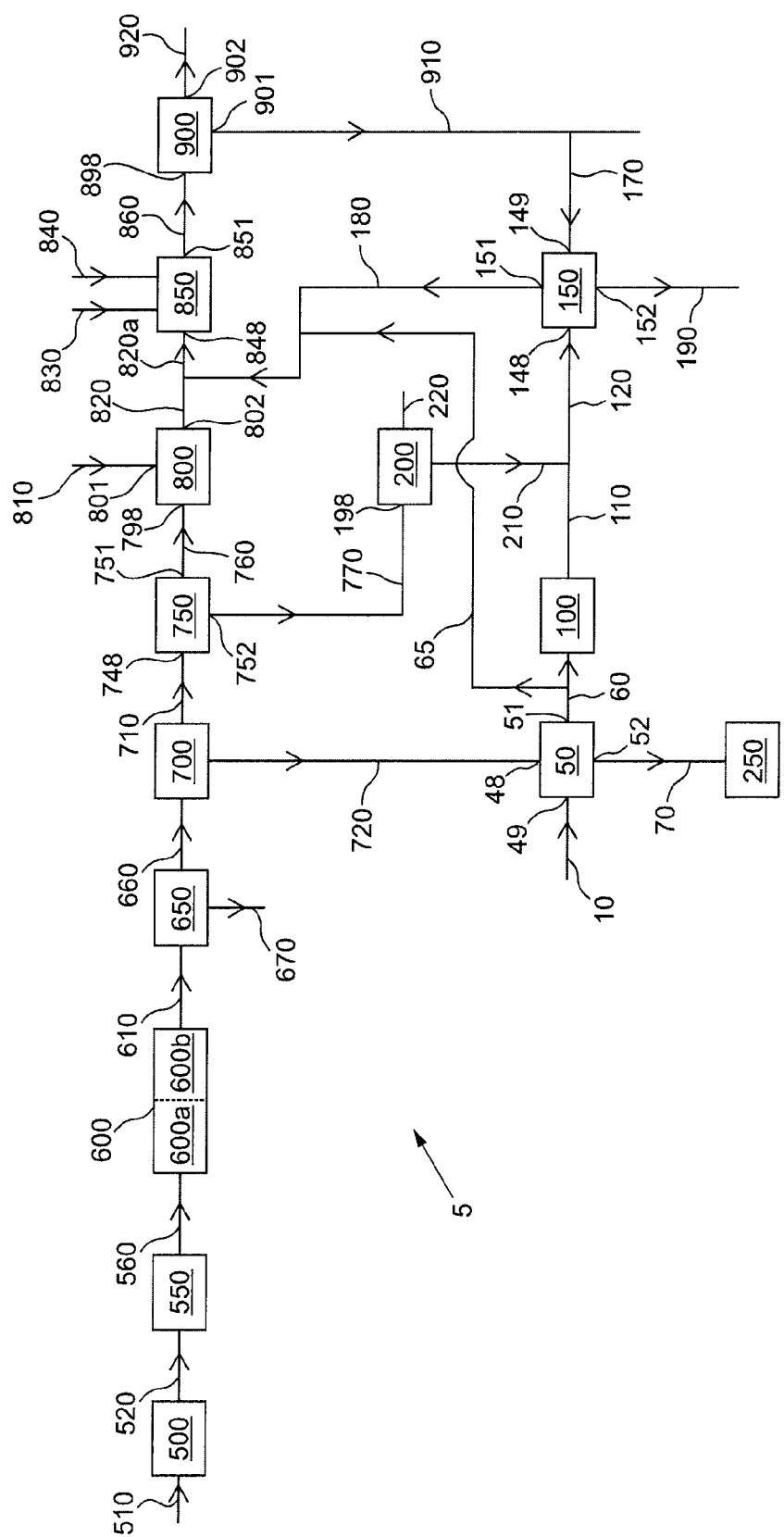
FIG. 2 shows a second embodiment of a typical scheme for treating an acid gas in a gasification process according to the method of the invention.

FIG. 2 shows a generalised gasification apparatus 5, such as a coal gasification apparatus, utilising the method of treating an acid gas stream disclosed herein. Those streams, units and zones described in respect of FIG. 1 will have identical reference numerals, names and functions in the scheme of FIG. 2.

A hydrocarbon feed 560, such as a prepared coal feed, is provided by passing a raw hydrocarbon 510, such as a coal feedstock, to a coal milling and drying unit 500, where it is processed, optionally with flux, to provide a milled coal feed 520. The milled coal feed 520 is then passed to a coal feeding unit 550, which provides the hydrocarbon feed 560, such as milled and dried coal, to gasifier 600.

Gasifier 600 comprises a gasifying zone 600a and a cooling zone 600b. Inside the gasifying zone 600a the hydrocarbon feed, such as the milled and dried coal, is fed into burners, along with nitrogen, oxygen and steam. Ash, in the form of slag, gravitates down the gasifying zone 600a and into a slag quench tank, from which it can be transferred to a receiving bin for disposal. The product synthesis gas rises in the gasifying zone to an upper quench section, where it can be quenched by recycled syngas, for instance from a bleed stream from the raw syngas stream 710 (discussed below) after appropriate recompression, to provide a hot syngas stream. The hot syngas stream comprises CO, $H_2$, particulate solids, HCN, $NH_3$, $H_2S$, $CO_2$ and optionally one or both of COS and $CS_2$. In many cases, COS will be present because if it is formed from the equilibrium reaction between $H_2S$ and $CO_2$. The hot syngas stream can then be passed to a cooling zone 600b, such as a syngas cooler or waste heat boiler, where it is further cooled against a water stream, such as a boiling water stream, to provide a saturated steam stream (not shown) and a cooled syngas stream 610 comprising CO, $H_2$, particulate solids, HCN, $NH_3$, $H_2S$, $CO_2$ and optionally one or both of COS and $CS_2$.

The cooled syngas stream 610 can then be passed to a dry solids removal unit 650, such as a cyclone separator, where a large fraction of the particulate solids are separated from the gaseous components to provide fly ash 670 and a wet solids syngas stream 660 comprising CO, $H_2$, particulate solids, $H_2O$, HCN, $NH_3$, $H_2S$, $CO_2$ and optionally one or both of COS and $CS_2$.

The wet solids syngas stream 660 can be passed to a wet scrubbing column 700, where it can be scrubbed to remove additional particulate solids to provide a slurry bleed stream 720 comprising particulate solids, HCN, $NH_3$, $H_2S$, $CO_2$ and optionally one or both of COS and $CS_2$, and a raw syngas stream 710 comprising CO, $H_2$, and $CO_2$ together with unwanted components $H_2S$, HCN and $NH_3$ and optionally one or both of COS and $CS_2$.

The raw syngas stream 710 can be passed to a first inlet 748 of a high pressure hydrolysis zone 750, where HCN and, if present, COS and $CS_2$ are hydrolysed to provide a hydrolysed syngas stream 760 at a first outlet 751 and a condensed water stream 770 at a second outlet 752. Ammonia present in the raw syngas stream 710 is separated to the condensed water stream 770. The hydrolysed syngas stream 760 comprises CO, $H_2$, $H_2S$ and $CO_2$ and can be saturated with water. The condensed water stream 770 comprises $H_2O$, $NH_3$, $CO_2$ and $H_2S$. The condensed water stream 770 can be passed to a sour water stripper 200 for further processing as discussed below.

The pressure in the high pressure hydrolysis zone 750 can be in the range of 1 to 100 bara, more preferably in the range of 2 to 80 bara.

In the high pressure hydrolysis zone 750, HCN and, if applicable, one or both of COS and $CS_2$ are converted according to the following reactions:

Hydrolysis of HCN: $HCN + H_2O \rightarrow NH_3 + CO$     (A)

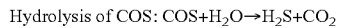
Hydrolysis of COS: $COS + H_2O \rightarrow H_2S + CO_2$     (B)

Hydrolysis of $CS_2$: $CS_2 + 2H_2O \rightarrow 2H_2S + CO_2$     (C)

The amount of water/steam in the high pressure hydrolysis zone 750 is preferably between 10 v/v % and 80 v/v %, more preferably between 20 v/v % and 70 v/v %, still more preferably between 30 v/v % and 50 v/v %, based on steam. At the preferred water/steam amounts, the conversion of HCN and optionally one or both of COS and $CS_2$ is improved. Typically, the amount of $H_2O$ in the raw syngas stream 710 is sufficient to achieve conversion of HCN and optionally one or both of COS and $CS_2$ if present.

Optionally, water or steam or a mixture thereof may be added to the raw syngas stream 710 prior to passing it to the high pressure hydrolysis zone 750, in order to achieve the desired water/steam amount. Optionally, the reaction conditions are selected in such a way, that the reaction mixture remains below the dew point of $H_2O$. The $H_2O$ in the gas stream can then advantageously be used for the conversion of HCN and optionally COS and/or $CS_2$ to the desired levels.

If one or both of COS and $CS_2$ are present, the total concentration of COS and $CS_2$ in the hydrolysed syngas stream 760 is suitably between 10 ppmv and 2 vol %, preferably between 20 ppmv and 1 vol %, based on the total gas stream.

The high pressure hydrolysis zone 750 can be a gas/solid contactor, preferably a fixed bed reactor. Catalysts for the hydrolysis of HCN, COS and $CS_2$ are known to those skilled in the art and include for example $TiO_2$-based catalysts or catalysts based on alumina and/or chromium-oxide. Preferred catalysts are $TiO_2$-based catalysts.

The hydrolysis results in a hydrolysed syngas stream 760 comprising $NH_3$, $H_2S$ and $CO_2$ which is HCN— and if applicable COS— and $CS_2$— lean, for instance having a concentration of HCN below 0.01 vol %, suitably between 0.1 ppmv and 0.01 vol %, preferably between 1 ppmv and 50 ppmv, based on the total gas stream.

The concentration of COS, if present, in the hydrolysed syngas stream 760 is below 0.01 vol %, suitably between 10 ppmv and 0.01 vol %, preferably between 15 ppmv and 100 ppmv, based on the total gas stream.

The concentration of $CS_2$, if present, in the hydrolysed syngas stream 760 is below 0.01 vol %, suitably between 1 ppmv and 0.01 vol %, preferably between 2 ppmv and 50 ppmv, based on the total gas stream.

The hydrolysed syngas stream 760 can be passed to the first inlet 798 of an acid gas removal unit 800, such as those known in the art. The acid gas removal unit 800 removes acid gases such as $H_2S$ and a portion of the $CO_2$ from the syngas to provide a treated syngas stream 810 at first outlet 801. The treated syngas stream 810 comprises $CO_2$, CO and $H_2$, and more preferably consists essentially of $CO_2$, CO and $H_2$. The treated syngas can then be passed for further processing, such as to a Fischer-Tropsch unit for conversion into longer chain liquid hydrocarbons, used as a fuel source for power generation, for instance using a gas turbine or a CO shift reaction carried out with water to produce hydrogen and carbon dioxide.

In this way, the raw syngas stream 710 is treated to provide a treated syngas stream 810 from which HCN, $NH_3$, $H_2S$, a portion of the $CO_2$ and, if present, COS and $CS_2$ have been removed.

The acid gas removal unit 800 also provides an acid gas stream 820 at a second outlet 802. The acid gas stream 820 comprises the acid gases $H_2S$ and $CO_2$ separated from the hydrolysed syngas stream 760.

The acid gas removal can be carried out by contacting the hydrolysed syngas stream 760 with an absorbing liquid to transfer $H_2S$ and a portion of the $CO_2$ from the hydrolysed syngas stream to the absorbing liquid. This is preferably carried out at relatively high pressure and ambient temperature.

The absorbing liquid comprising $H_2S$ and $CO_2$ can then be separated from the remaining gaseous components which leave the unit as the treated syngas stream 810. The separated absorbing liquid comprising $H_2S$ and $CO_2$ can then be regenerated by a stripping gas, normally at relatively low pressure and high temperature, to provide the acid gas stream 820 comprising $CO_2$ and $H_2S$.

The absorbing liquid may be any liquid capable of removing $H_2S$ and a portion of the $CO_2$ from the hydrolysed syngas stream. Absorbing liquids may comprise chemical and/or physical solvents. A preferred physical solvent is Selexol. A combination of chemical and physical solvents is particularly preferred. Suitable chemical solvents are primary, secondary and/or tertiary amines. A preferred chemical solvent is a secondary or tertiary amine, more preferably an amine compound derived from ethanol amine, even more preferably DIPA, DEA, MEA, DEDA, MMEA (monomethyl ethanolamine), MDEA or DEMEA (diethyl monoethanolamine). DIPA and/or MDEA are particularly preferred. It is believed that these compounds react with acidic compounds such as $H_2S$ and/or $CO_2$, thereby removing $H_2S$ and/or $CO_2$ from the hydrolysed syngas stream 760.

Suitable physical solvents are sulfolane (cyclotetramethylenesulfone) and its derivatives, aliphatic acid amines, N-methylpyrrolidone, N-alkylated pyrrolidones and the corresponding piperidones, methanol, ethanol and dialkylethers of polyethylene glycols or mixtures thereof. The preferred physical solvent is sulfolane. It is believed that $H_2S$ and/or $CO_2$ will be taken up in the physical solvent and thereby removed from the hydrolysed syngas stream 760. Additionally, if mercaptans are present, they will be taken up in the physical solvent as well.

Preferably, the absorbing liquid comprises sulfolane, MDEA or DIPA, and water.

The concentration of $H_2S$ in the treated syngas stream 810 is lower than the concentration of $H_2S$ in the hydrolysed syngas stream 760. Typically, the concentration of $H_2S$ in the treated syngas stream 810 is in the range of 0.0001% to 20%, more preferably from 0.0001% to 10% of the $H_2S$ concentration in the hydrolysed syngas stream 760. Suitably, the concentration of $H_2S$ in the treated syngas stream 810 is less than 10 ppmv, more preferably less than 5 ppmv.

The acid gas stream 820 can be passed to the first inlet 848 of an incinerator 850 and further treated as discussed in relation to FIG. 1.

In a further embodiment, FIG. 2 discloses how the first off-gas stream 120 which is passed to the ammonia scrubber 150 can be provided from an off-gas stream generated as part of the gasification process, thereby providing an integrated treatment method and apparatus.

In one embodiment, the first off-gas stream 120 can be derived from the slurry bleed stream 720. The slurry bleed stream 720 is produced by the wet scrubbing column 700 and comprises particulate solids, HCN, $NH_3$, $H_2S$, $CO_2$ and optionally one or both of COS and $CS_2$. This can be passed to the first inlet 48 of a sour slurry stripper 50 for further separation. The sour slurry stripper 50 can also be supplied with a steam stream 10 at a second inlet 49. In a further embodiment, the sour slurry stripper 50 may be supplied with additional components, such as a buffer to maintain the pH within the stripper. The steam can strip the gaseous components from the slurry bleed stream to provide a slurry stripper off-gas stream 60 comprising HCN, $NH_3$, $H_2S$, $CO_2$ and optionally one or both of COS and $CS_2$, at the first outlet 51 of the sour slurry stripper 50 and a stripped slurry stream 70 comprising particulate solids at a second outlet 52 of the sour slurry stripper 50. The slurry stripper off-gas stream 60 can be substantially free of particulate solids. The stripped slurry stream 70 can be passed to a clarifier 250 to dispose of the slurry of particulate solids.

The slurry stripper off-gas stream 60 can then be passed to a low pressure hydrolysis zone 100 to obtain a hydrolysed off-gas stream 110 comprising $NH_3$, $H_2S$ and $CO_2$, which can be passed to the first inlet 148 of the ammonia scrubber 150 as the first off-gas stream 120.

The slurry stripper off-gas stream 60 can be used to generate an additional source of sulphur dioxide for the sulphuric acid unit 900 from the hydrogen sulphide component. This can be achieved by passing at least a part of the slurry stripper off-gas stream 60 directly to the incinerator 850 as stripper off-gas slip stream 65, where the hydrogen sulphide is combusted to provide the sulphur dioxide feedstock for the sulphuric acid unit 900. In the embodiment shown in FIG. 2, the stripper off-gas slip stream 65 is combined with the scrubber off-gas stream 180 before being passed to the first inlet 848 of the incinerator 850 as combined acid gas stream 820a. However, the stripper off-gas slip stream 65 can also be passed to a separate inlet of the incinerator 850.

This embodiment is preferred in those cases where the slurry stripper off-gas stream 60 contains little or no HCN, COS and $CS_2$. However, small concentrations of HCN, and any COS and $CS_2$ present in the stream can be combusted in incinerator 850 to generate $H_2O$, $CO_2$, $SO_2$ and $N_2$. Ammonia present in the stream will be combusted to its combustion products such as $N_2$ and $H_2O$.

Even in those cases where there is no stripper off-gas slip stream 65, the hydrogen sulphide in the slurry stripper off-gas stream 60 will ultimately be passed to the incinerator 850 in scrubber off-gas stream 180, after treatment in low pressure hydrolysis zone 100 and ammonia scrubber 150.

The low pressure hydrolysis zone 100 is similar in nature to the high pressure hydrolysis zone 750 used in the treatment of the raw syngas stream 710. The low pressure hydrolysis zone generally comprises a hydrolysis catalyst. The slurry stripper off-gas stream 60 is at a lower pressure compared to the raw syngas stream 710 passed to the high pressure hydrolysis zone 750, such as at a pressure in the range of >1 to 10 bar, more preferably about 1.3 to 4.0 bar. The pressure in the low pressure hydrolysis zone 100 is thus in a similar range.

In the low pressure hydrolysis zone 100, HCN and, if applicable, one or both of COS and $CS_2$ are converted according to reactions (A) to (C) discussed for the high pressure hydrolysis zone 750. The ammonia level in the slurry stripper off-gas stream 60 can be significantly higher than that in the raw syngas stream 710 sent to the high pressure hydrolysis zone 750. For instance the ammonia content of the slurry stripper off-gas stream 60 can be about 4 mol %, compared to 200 ppm in the raw syngas stream 710.

The amount of water/steam in the low pressure hydrolysis zone 100 is preferably the same or higher than that for the high pressure hydrolysis zone 750. Higher water contents encourage the hydrolysis reaction. Generally the water/steam content may be in the range of 30-50%, with 35% being more preferred. Typically, the amount of $H_2O$ in the slurry stripper off-gas stream 60 from the sour slurry stripper 50 is sufficient to achieve conversion of HCN and optionally one or both of COS and $CS_2$. This is because the overhead conditions of the sour slurry stripper 50 of about 100° C. is sufficient to saturate the slurry stripper off-gas stream 60 with water. The low pressure hydrolysis reaction can be carried out at higher temperatures, for instance around 200° C., compared to the high pressure hydrolysis because unwanted side reactions occurring during the hydrolysis of the raw syngas stream 710 at higher pressures and temperatures are not of concern to the slurry stripper off-gas stream 60.

If one or both of COS and $CS_2$ are present, the total concentration of COS and $CS_2$ in the sour slurry stripper off-gas stream 60 is suitably between 10 ppmv and 2 vol %, preferably between 20 ppmv and 1 vol %, based on the total gas stream.

The low pressure hydrolysis zone 100 can be a gas/solid contactor, preferably a fixed bed reactor. Catalysts for the hydrolysis of HCN and optionally one or both of COS and $CS_2$ are known to those skilled in the art and include for example $TiO_2$-based catalysts or catalysts based on alumina and/or chromium-oxide. Preferred catalysts are $TiO_2$-based catalysts.

The hydrolysis results in a hydrolysed off-gas stream 110 comprising $NH_3$, $H_2S$ and $CO_2$ which is HCN— and if applicable COS— and $CS_2$— lean, for instance having a concentration of HCN below 0.01 vol %, suitably between 0.1 ppmv and 0.01 vol %, preferably between 1 ppmv and 50 ppmv, based on the total gas stream.

The concentration of COS, if present, in the hydrolysed off-gas stream 110 is below 0.01 vol %, suitably between 10 ppmv and 0.01 vol %, preferably between 15 ppmv and 100 ppmv, based on the total gas stream.

The concentration of $CS_2$, if present, in the hydrolysed off-gas stream 110 is below 0.01 vol %, suitably between 1 ppmv and 0.01 vol %, preferably between 2 ppmv and 50 ppmv, based on the total gas stream.

The hydrolysed off-gas stream 110 can be passed to the first inlet 148 of the ammonia scrubber 150 as the first off-gas stream 120. In a preferred embodiment, the hydrolysed off-gas stream 110 is combined with the sour water stripper off-gas stream 210, which is discussed below, to provide a combined stripper off-gas stream as the first off-gas stream 120 which is passed to the ammonia scrubber 150.

As already discussed, the raw syngas stream 710 produced by the wet scrubbing column 700 can be passed to a high pressure hydrolysis zone to provide a hydrolysed syngas stream 760 comprising CO, $H_2$, $H_2S$ and $CO_2$ and a condensed water stream 770 comprising $H_2O$, $NH_3$, $CO_2$ and $H_2S$. The condensed water stream 770 can be passed to the first inlet 198 of a sour water stripper 200.

A stripping agent such as steam can be used to separate the gaseous components of the condensed water stream 770 such as $NH_3$, $H_2S$ and $CO_2$ in the sour water stripper 200 to provide a sour water stripper off-gas stream 210 comprising $NH_3$, $H_2S$ and $CO_2$ and a sour water stripper water stream 220.

The sour water stripper off-gas stream 210 can be passed to a first inlet 148 of the ammonia scrubber 150 as the first off-gas stream 120, or combined with the slurry stripper off-gas stream 110 to provide a combined stripper off-gas stream before being passed to the ammonia stripper 150 for treatment as discussed above.

The person skilled in the art will understand that the present invention can be carried out in many various ways without departing from the scope of the appended claims. For instance, it will be apparent that the method disclosed herein is applicable to the treatment of a natural gas stream comprising $H_2S$, in which the acid gas stream is provided by the acid gas treatment unit which removes acid gas from the natural gas stream. The first off-gas stream could be provided by an ammonia-comprising stream external to the natural gas treatment plant. Alternatively, the method disclosed herein could be used in the treatment of a refinery off-gas stream, for instance from the catalytic cracker, which may comprise ammonia if there is any nitrogen present in the compounds found in the feed gas.

What is claimed is:

1. A method of treating an acid gas stream comprising $H_2S$ and $CO_2$ to provide an aqueous ammonium sulphate stream, wherein the method comprises at least the steps of:
    (a) passing the acid gas stream to an incinerator to oxidise $H_2S$ to $SO_2$ and to provide an incinerator flue gas stream comprising $SO_2$ and $CO_2$;
    (b) passing the incinerator flue gas stream to a sulphuric acid unit to produce $H_2SO_4$ from $SO_2$ in the flue gas stream and to provide an aqueous sulphuric acid stream and a sulphuric acid unit off-gas stream comprising $CO_2$; and
    (c) passing at least a part of the aqueous sulphuric acid stream to an ammonia scrubber which is provided with a first off-gas stream which comprises $NH_3$, $H_2S$ and $CO_2$ to separate $NH_3$ to provide a scrubber off-gas stream comprising $H_2S$ and $CO_2$ and an aqueous ammonium sulphate stream.

2. The method according to claim 1 further comprising the step of:
    (d) passing the scrubber off-gas stream to the incinerator.

3. The method according to claim 1, wherein at least part of the first off-gas stream is provided by the further steps comprising:
    (i) providing a slurry bleed stream comprising particulate solids, HCN, $NH_3$, $H_2S$, $CO_2$ and optionally one or both of COS and $CS_2$;
    (ii) passing the slurry bleed stream to a sour slurry stripper to separate particulate solids from the slurry bleed stream to provide a slurry stripper off-gas stream comprising HCN, $NH_3$, $H_2S$, $CO_2$ and optionally one or both of COS and $CS_2$, and a stripped slurry stream comprising particulate solids; and
    (iii) passing the slurry stripper off-gas stream to a low pressure hydrolysis zone to hydrolyse HCN and optionally one or both of COS and $CS_2$ to provide the first off gas stream as a hydrolysed off-gas stream comprising $NH_3$, $H_2S$ and $CO_2$.

4. The method according to claim 1 wherein at least a part of the first off-gas stream is provided by the further steps comprising:
    (iv) providing a condensed water stream comprising $H_2O$, $NH_3$, $CO_2$ and $H_2S$; and
    (v) passing the condensed water stream to a sour water stripper to provide the first off-gas stream as a sour water stripper off-gas stream comprising $NH_3$, $H_2S$ and $CO_2$ and a sour water stripper water stream.

5. The method according to claim 1 wherein the acid gas stream is provided by the further steps comprising:
    providing a raw syngas stream comprising CO, $H_2$, HCN, $NH_3$, $H_2S$, $CO_2$ and optionally one or both of COS and $CS_2$;
    passing the raw syngas stream to a high pressure hydrolysis zone to hydrolyse HCN and optionally one or both of COS and $CS_2$ to provide a hydrolysed syngas stream comprising CO, $H_2$, $NH_3$, $H_2S$ and $CO_2$ and a condensed water stream comprising $NH_3$, $CO_2$ and $H_2S$; and
    passing the hydrolysed syngas stream to an acid gas removal unit to separate $H_2S$ and $CO_2$ from the hydrolysed syngas stream to provide a treated syngas stream comprising CO, $CO_2$ and $H_2$ and the acid gas stream.

6. The method according to claim 5 wherein the raw syngas stream is provided by the further steps comprising:
    providing a wet solids syngas stream comprising CO, $H_2$, particulate solids, $H_2O$, HCN, $NH_3$, $H_2S$ and optionally one or both of COS and $CS_2$; and
    passing the wet solids syngas stream to a wet scrubbing column to separate particulate solids from the wet solids syngas stream to provide the raw syngas stream and a slurry bleed stream comprising particulate solids, HCN, $NH_3$, $H_2S$, $CO_2$ and optionally one or both of COS and $CS_2$.

7. The method according to claim 6 wherein the wet solids syngas stream is provided by the further steps comprising:
    gasifying a hydrocarbon feed in a gasification zone to provide a hot syngas stream comprising CO, $H_2$, particulate solids, HCN, $NH_3$, $H_2S$, $CO_2$ and optionally one or both of COS and $CS_2$;
    cooling the hot syngas stream in a cooling zone to provide a cooled syngas stream; and separating dry solids from the cooled syngas stream in a dry solids removal unit to provide fly ash and the wet solids syngas stream.

8. An apparatus for treating an acid gas stream, comprising at least:

an incinerator to oxidise $H_2S$ to $SO_2$ in an acid gas stream comprising $H_2S$ and $CO_2$, said incinerator having a first inlet or the acid gas stream and a first outlet for an incinerator flue gas stream comprising $SO_2$ and $CO_2$;

a sulphuric acid unit to produce $H_2SO_4$ from $SO_2$ in the incinerator flue gas stream, said sulphuric acid unit having a first inlet for the incinerator flue gas stream connected to the first outlet of the incinerator, a first outlet for an aqueous sulphuric acid stream and a second outlet for a sulphuric acid unit off-gas stream comprising $CO_2$; and an ammonia scrubber to separate $NH_3$ from a first off-gas stream which comprises $NH_3$, $H_2S$ and $CO_2$ to provide a scrubber off-gas stream comprising $H_2S$ and $CO_2$ and an aqueous ammonium sulphate stream, said ammonia scrubber having a first inlet for the first off-gas stream, a second inlet for the aqueous sulphuric acid stream connected to the first outlet of the sulphuric acid unit, a first outlet for the scrubber off-gas stream and a second outlet for the aqueous ammonium sulphate stream.

* * * * *